United States Patent
Sawai

[11] Patent Number: 5,838,898
[45] Date of Patent: Nov. 17, 1998

[54] MICROPROGRAM CONTROLLED DATA PROCESSING SYSTEM HAVING A RUNAWAY MONITOR FUNCTION

[75] Inventor: Yasunori Sawai, Tokyo, Japan

[73] Assignee: NEC Corporation, Tokyo, Japan

[21] Appl. No.: 528,054

[22] Filed: Sep. 14, 1995

[30] Foreign Application Priority Data

Sep. 14, 1994 [JP] Japan .................................. 6-219337

[51] Int. Cl.⁶ .................................................. G06F 11/00
[52] U.S. Cl. ...................................................... 395/185.03
[58] Field of Search ........................ 395/185.03, 184.01, 395/185.04; 364/265.6, 267, 267.2, 267.8

[56] References Cited

U.S. PATENT DOCUMENTS

| | | | |
|---|---|---|---|
| 3,707,703 | 12/1972 | Sakai ..................................... | 340/172.5 |
| 4,179,737 | 12/1979 | Kim ........................................ | 364/200 |
| 4,211,916 | 7/1980 | Baxansky et al. ........................ | 371/15 |
| 4,356,546 | 10/1982 | Whiteside et al. ....................... | 364/200 |
| 4,429,368 | 1/1984 | Kurii ...................................... | 364/200 |
| 4,704,704 | 11/1987 | Sato et al. ............................... | 364/900 |
| 4,783,762 | 11/1988 | Inoue et al. ............................. | 364/900 |
| 4,823,307 | 4/1989 | Melgara et al. ......................... | 364/900 |
| 5,129,079 | 7/1992 | Miyashita ................................ | 395/575 |
| 5,151,981 | 9/1992 | Westcott et al. ........................ | 395/375 |
| 5,263,153 | 11/1993 | Intrater et al. ...................... | 395/185.04 |
| 5,499,370 | 3/1996 | Hosaka et al. .......................... | 395/650 |
| 5,530,802 | 6/1996 | Fuchs et al. ....................... | 395/182.15 |
| 5,701,481 | 5/1984 | Hosaka et al. .......................... | 395/676 |

FOREIGN PATENT DOCUMENTS

| | | | |
|---|---|---|---|
| 0 283 115 | 9/1988 | European Pat. Off. | ........ G06F 15/00 |
| 0 343 988 | 11/1989 | European Pat. Off. | .......... G06F 9/38 |
| 0 445 936 | 9/1991 | European Pat. Off. | ........ G06F 11/00 |
| 0 479 428 | 4/1992 | European Pat. Off. | ........ G06F 13/42 |
| 0 487 254 | 5/1992 | European Pat. Off. | ........ G06F 13/28 |
| 58-169245 | 10/1983 | Japan | .............................. G06F 9/22 |
| 4-211843 | 8/1992 | Japan | ............................. G06F 11/30 |
| 2 241 799 | 9/1991 | United Kingdom | ............ G06F 11/28 |

OTHER PUBLICATIONS

Patent Abstracts of Japan, vol. 7, No. 101 (P–194), Apr. 28, 1983, Yasuo et al., "Error Detection System for Microprogram", Publication No. JP–A–58024951.

Nozuyama et al., "Implementation and Evaluation of Microinstruction Controlled Self Test Using a Masked Microinstruction Scheme", IEEE, pp. 624–632, 1989.

Primary Examiner—Robert W. Beausoliel, Jr.
Assistant Examiner—Stephen C. Elmore
Attorney, Agent, or Firm—Foley & Lardner

[57] ABSTRACT

A microprogram controlled data processing system includes an instruction controller receiving a given instruction code for generating a micro address, a micro ROM receiving the micro address for generating a set of micro codes corresponding to the given instruction code, a micro decoder receiving the set of micro codes for generating a predetermined series of microorders, and a runaway detecting circuit for monitoring the order of execution of the series of microorders and generating an abnormal signal on the basis of the result of the monitoring.

11 Claims, 12 Drawing Sheets

FIGURE 5

OPERATION OF INSTRUCTION CONTROLLER 102

| INSTRUCTION CODE Q0 | MICRO ADDRESS MA | INSTRUCTION |
|---|---|---|
| n | n | MEMORY WRITE |
| n+1 | n+1 | UNDEFINED |
| n+2 | n+2 | UNDEFINED |
| n+3 | n+3 | UNDEFINED |
| m | m | MEMORY READ |
| m+1 | m+1 | UNDEFINED |
| m+2 | m+2 | UNDEFINED |
| m+3 | m+3 | UNDEFINED |

FIGURE 6

OPERATION OF MICRO-DECODER 103

| MICROCODE | | | STRDY | LDRDY | MICROORDER | ORRS |
|---|---|---|---|---|---|---|
| MSTL 2 | MSTL 1 | MSTL 0 | | | | |
| 0 | 0 | 1 | 1 | X | DPWR | 0 |
| 0 | 0 | 1 | 0 | X | NOP | 1 |
| 0 | 1 | 0 | X | X | STRQ | 0 |
| 0 | 1 | 1 | X | X | STWR | 0 |
| 1 | 0 | 0 | X | X | LDRQ | 0 |
| 1 | 0 | 1 | X | 1 | LDRD | 0 |
| 1 | 0 | 1 | X | 0 | NOP | 1 |
| 1 | 1 | 0 | X | X | END | 0 |

FIGURE 8

CONTENT OF MICRO ROM 101

| MICRO ADDRESS MA | MICROCODE | | | MICROORDER |
|---|---|---|---|---|
| | MSTL 2 | MSTL 1 | MSTL 0 | |
| n | 0 | 0 | 1 | DPWR |
| n+1 | 0 | 1 | 0 | STRQ |
| n+2 | 0 | 1 | 1 | STWR |
| n+3 | 1 | 1 | 0 | END |
| m | 0 | 0 | 1 | DPWR |
| m+1 | 1 | 0 | 0 | LDRQ |
| m+2 | 1 | 0 | 1 | LDRD |
| m+3 | 1 | 1 | 0 | END |

MICROPROGRAM CONTROLLED DATA PROCESSING SYSTEM HAVING A RUNAWAY MONITOR FUNCTION

BACKGROUND OF THE INVENTION

1. Field of the Invention

The present invention relates to a data processing system, and more specifically to a microprogram controlled data processing system having a function of monitoring a runaway in an instruction execution.

2. Description of Related Art

Referring to FIG. 1, there is shown one example of a conventional circuit for monitoring a runaway in an instruction execution in a data processing system, which is disclosed in Japanese Patent Application Laid-open No.JP-A-4-211843. In this conventional example, a plurality of operation monitoring instructions are previously prepared, and located separately from each other in a stream of a program, so that when the program is executed, the order of execution of operation monitoring instructions and the intervals of execution of operation monitoring instructions are monitored in the stream of the program.

As shown in FIG. 1, the system includes a data processing unit 10 coupled to a data bus 12 and an address bus 14, an address decoder 16 connected to the address bus 14 for outputting four address decode signals L1 to L4, and a monitoring circuit 22 connected to receive the four address decode signals L1 to L4, for monitoring a runaway of a program.

In the monitor circuit 22, a counter 26 receives and counts a clock CK supplied from an external source, for generating a carry signal CO 45, which is supplied to one input of a two-input OR gate 42. A shift register 28 is composed of four flipflops (latches) 44.1 to 44.4 cascaded in the form of a ring, and a content of each of the flipflops 44.1 to 44.4 is shifted to a next flipflop in response to an output CL of an inverter 38.

An output of the four flipflops 44.1 to 44.4 and the four address decode signals L1 to L4 are supplied to four AND gates 30 to 30.4, respectively. More specifically, the AND gate 30.1 receives the output of the flipflop 44.1 and the address decode signal L1, and the AND gate 30.2 receives the output of the flipflop 44.2 and the address decode signal L2. The AND gate 30.3 receives the output of the flip-flop 44.3 and the address decode signal L3, and the AND gate 30.4 receives the output of the flipflop 44.4 and the address decode signal L4.

An output of the AND gates 30.1 to 30.4 are connected to an OR gate 32. In addition, the four address decode signals L1 to L4 are supplied to another OR gate 34, and an output 49 of this OR gate 34 is supplied through the inverter 38 to a clock input of the shift register 28. On the other hand, an output 47 of the OR gate 32 is inputted to a reset input R of the counter 26, and also supplied through an inverter 35 to an input of an AND gate 40. The other input of this AND gate 40 receives the output 49 of the OR gate 34.

An output of the AND gate 40 and the carry output 45 of the counter 26 are supplied to an OR gate 42, which in cum has an output supplied as a reset input RS to the data processing unit 10. The output of the OR gate 42 is also supplied to reset an initializing circuit 46 for the counter 26 and the shift register 28.

Now, operation of the above mentioned conventional example will be described. The data processing unit 10 has previously prepared operation monitor instructions WDI1, WDI2, WDI3 and WDI4, which are previously encoded into a loop included in a program to be executed, by a user, at suitable intervals and in the order of WDI1, WDI2, WDI3 and WDI4.

If the data processing unit 10 executes the operation monitor instructions WDI1, WDI2, WD13 and WDI4, respectively, the data processing unit 10 outputs inherent addresses ADR1, ADR2, ADR3 and ADR4 onto the address bus 14, respectively. The address decoder 16 activates the address decode signal L1 when the inherent address ADR1 is outputted on the address bus 14, and the address decode signal L2 when the inherent address ADR2 is outputted on the address bus 14. Furthermore, the address decoder 16 activates the address decode signal L3 when the inherent address ADR3 is outputted on the address bus 14, and the address decode signal L4 when the inherent address ADR4 is outputted on the address bus 14.

The monitor circuit 22 is initialized at the same time as the data processing unit 10 is initialized, in such a manner that the latch 44.1 is set to "1" and the latches 44.2, 44.3 and 44.4 are set to "0", and the counter 26 is cleared to "0" and the carry signal CO 45 is reset to "0". If the data processing unit starts a processing operation, the counter 26 is supplied with the clock CK so as to start a count-up operation.

First, a normal operation will be described. If the operation monitor instruction WDI1 is executed in the course of a processing, the address ADR1 is outputted to the address bus 14, and therefore, the address decode signal L1 is activated by the address decoder 16. Since the output of the latch 44.1 is "1" in the above mentioned initialized condition, the two-input AND gate 30.1 outputs "1", and therefore, the signal 47 of the OR gate 32 is brought to "1", and the signal 48 is brought to "0". In addition, the output signal 49 of the OR gate 34 is brought to "1".

In response to the signal 47, the counter 26 is cleated so that the carry signal CO remains at "0". On the other hand, the output of the two-input AND gate 40 is "0", the output signal RS of the OR gate 42 is maintained at "0". Accordingly, the data processing unit (microprocessor) 10 continues to execute the program. The inverter 38 receives the signal 49 of "1", and outputs "0" as the clock CL to the shift register 28, so that the latches 44.1, 44.3 and 44.4 are set to "0" and the latch 44.2 is set to "1".

Thereafter, if the operation monitor instructions WDI2, WDI3, and WDI4 are executed in the order in the course of a processing, the address decode signals L2, L3 and L4 are activated, respectively. The counter 26 is cleared at activation of each of the address decode signals L2, L3 and L4. After the operation monitor instructions WDI4 has been executed, the shift register 28 becomes set to the same condition as the initialized condition. Namely, the output of the latch 44.1 is "1" and the output of each of the other latches 44.2, 44.3 and 44.4 is "0". Since the program being executed is a looped condition, the operation monitor instruction WDI1 is executed again, so that the processing is continued.

Next, an abnormal operation will be explained by dividing it into two cases:

A first case is that the data processing unit 10 becomes incapable of responding, so that none of the address decode signals L1, L2, L3 and L4 becomes active. In this case, the counter 26 is not cleared, and therefore, when the counter 26 has received a predetermined number of clocks without being, the counter 26 becomes overflowed and therefore outputs the carry signal CO of "1". Therefore, the reset signal RS is brought to "1", with the result that the data processing unit 10 and the monitor circuit 22 are initialized, so that the abnormal condition is disabled.

A second case is that the order of the execution of the operation monitor instructions WDI1, WDI2, WDI3, and WDI4 is out of order because of an abnormality in the processing. This case will be explained without reference to a case in which after initialization, the operation monitor instruction WDI1 is not executed first, but instead the operation monitor instruction WDI2 is executed first.

Similarly to the normal operation, the initialized condition is that the latch 44.1 is set to "1" and the latches 44.2, 44.3 and 44.4 are set to "0", and the counter 26 is cleared to "0" and the carry signal CO 45 is reset to "0". In this condition, if the operation monitor instruction WDI2 is executed by the data processing unit 10, the address ADR2 is outputted onto the address bus 14, and the address decode signal L2 is activated to "1". In this condition, the output signal 47 of the OR gate 32 is "0", so that the signal 48 is "1", and on the other hand, the output signal 49 of the OR gate 34 is brought to "1", with the result that the signal RS is brought to "1". Thus, the data processing unit 10 and the monitor circuit 22 are initialized, so that the abnormal condition is disabled.

In the above mentioned conventional example, the monitor of the runaway is made in connection with the order of the execution of special instructions and the intervals of the execution of the special instructions.

Referring to FIG. 2, there is shown another conventional runaway monitor system in a microprogram controlled data processing system, which is disclosed in Japanese Patent Application Laid-open No. JP-A-58-169245. This conventional example is configured to compare a microprogram address in an expected order of execution previously prepared in a buffer memory, with an address of a microprogram actually executed.

As shown in FIG. 2, a data processing unit 50 is controlled by a microprogram, and is configured so that an address of a microprogram being currently executed is stored in a control memory 51 and is outputted as a signal 70.

On the other hand, a buffer memory 52 is formed of a FIFO (first-in first-out) type memory, and is set by the data processing unit 50 with respective addresses of microprograms in the expected order of execution. A head data (namely, address) stored in the buffer memory 53 is read out as a signal 72, and is updated in response to reading clock 74. If all of the contents of the buffer memory 53 have been read out, the buffer memory 53 generates an empty signal 76 for requesting to set the addresses of succeeding microprograms in the expected order of execution.

An instruction fetch signal 78 is generated at a timing of a microprogram address change, as shown in a timing chart of FIG. 3. On the other hand, a compare enable signal 60 controls a valid/invalid of a runaway monitor function, and is inactivated to "0" during a period in which no effective data (address) exists in the buffer memory 53.

A comparator 57 compares the signal 70 with the signal CPA, and outputs a signal 59 that is activated to "1" when coincidence is obtained and to "0" when coincidence is not obtained.

The compare enable signal 60 and the output signal 59 of the comparator 57 are supplied to an AND gate 61, whose output is connected to an S input of a flipflop 63. An inverted output $\overline{Q}$ 65 of the flipflop 63 is also connected to the AND gate 61. The flipflop 63 also has a clock input "ck" connected to receive the instruction fetch signal WCSAR 78 and a non-inverted output Q 64 connected to an R input of the flipflop 63 itself. The flipflop 63 also has an asynchronous reset input "res" receiving a reset signal 66.

Now, operation of this second conventional example will be described with reference to FIG. 3. When the data processing unit 50 is reset, the reset signal 66 is brought to "0", so that the signal 64 is brought to "0" and the signal 65 is brought to "1". In addition, the data processing unit 50 writes microprogram addresses in an expected order of execution into the buffer memory 53. Thereafter, the compare enable signal 60 is brought to "1", so that the runaway monitor is started.

When the signal 70 and the signal 72 are not coincident with each other, the signal 59 is "0", and so the signal 62 is "0". Thus, the signal 64 is also "0" and the signal 65 is "1" is maintained. If the signal 70 and the signal 72 become coincident with each other, the signal 62 is brought to "1", so that the signal 64 is also brought to "1", and the signal 65 is brought to "0". Therefore, the signal 74 is brought to "1", so that the output signal 72 of the buffer memory 53 is updated. At a rising edge of a next signal 78, the signal 64 is returned to "0" and the signal 65 is also returned to "1", so that an address collation is continued.

The above mentioned operation is continued, and if coincidence of the number corresponding to the number of the microprogram addresses in the expected order of execution stored in the buffer memory 53 is detected, the valid data stored in the buffer memory 53 becomes empty, so that the empty signal 76 is outputted. In response to this empty signal 76, the compare enable signal CEB is temporarily brought to "0", and the data processing unit 50 checks the result of the monitor, for the purpose of discriminating a normality/abnormality of the operation. If the result of the discrimination shows normality, the data processing unit 50 writes new microprogram addresses in the expected order of execution into the buffer memory 53, so that the runaway monitor is restarted. On the other hand, if the result of the discrimination shows abnormality, the data processing unit 50 goes into an abnormality processing, in which a shift register (not shown) is initialized, for example.

In the above mentioned second conventional example, the detection of the runaway is performed at only the timing of writing the microprogram addresses in the expected order of execution into the buffer memory 53. Therefore, if the runaway occurs and the address of the executed microprogram becomes different, the operation cannot go into the abnormality processing, unless the coincidence between the signal 70 and the signal 72 accidentally occurs, with the number of the valid data stored in the buffer memory 53.

As seen from the above, the first conventional example shown in FIG. 1 performs the runaway monitoring by paying attention to the order of execution of special instructions and the intervals of execution of the special instructions. However, this means that abnormality cannot be detected unless the order of execution of special instructions becomes out of order and unless the runaway condition continues for a predetermined time.

On the other hand, the second conventional example shown in FIG. 2 requires a substantial processing time for detecting abnormality and for disabling the abnormality. Therefore, during a runaway period, the data is interrupted and the control system does not operate correctly. Therefore, it cannot be applied to a field requiring a real time control.

SUMMARY OF THE INVENTION

Accordingly, it is an object of the present invention to provide a microprogram controlled data processing system having a runaway monitoring function, which has overcome the above mentioned defects of the conventional ones.

Another object of the present invention is to provide a microprogram controlled data processing system having a runaway monitoring function, capable of detecting the runaway in real time with execution of a program, thereby quickly avoiding an interruption of data and faulty operation of the system, for the purpose of greatly elevating reliability of the system.

The above and other objects of the present invention are achieved in accordance with the present invention by a microprogram controlled data processing system including a microorder generating means for generating a predetermined series of microorders on the basis of an instruction code received, and an execution order detection means for detecting the order of execution of generate an abnormal signal as to generate an abnormal signal on the basis of the result of the detection.

With above mentioned arrangement, the order of execution of the predetermined sequence of microorders is detected, and if abnormality is detected in the order of execution, the abnormal signal is generated to perform a special processing such as a system resetting.

The above and other objects, features and advantages of the present invention will be apparent from the following description of preferred embodiments of the invention with reference to the accompanying drawings.

BRIEF DESCRIPTION OF THE DRAWINGS

FIG. 5 is a table illustrating an operation of an instruction controller included in the data processing system shown in FIG. 4;

FIG. 6 is a table illustrating an operation of a micro decoder included in the data processing system shown in FIG. 4;

FIG. 8 is a table illustrating an input/output relation of a micro ROM included in the data processing system shown in FIG. 4;

DESCRIPTION OF THE PREFERRED EMBODIMENTS

Figure 1:
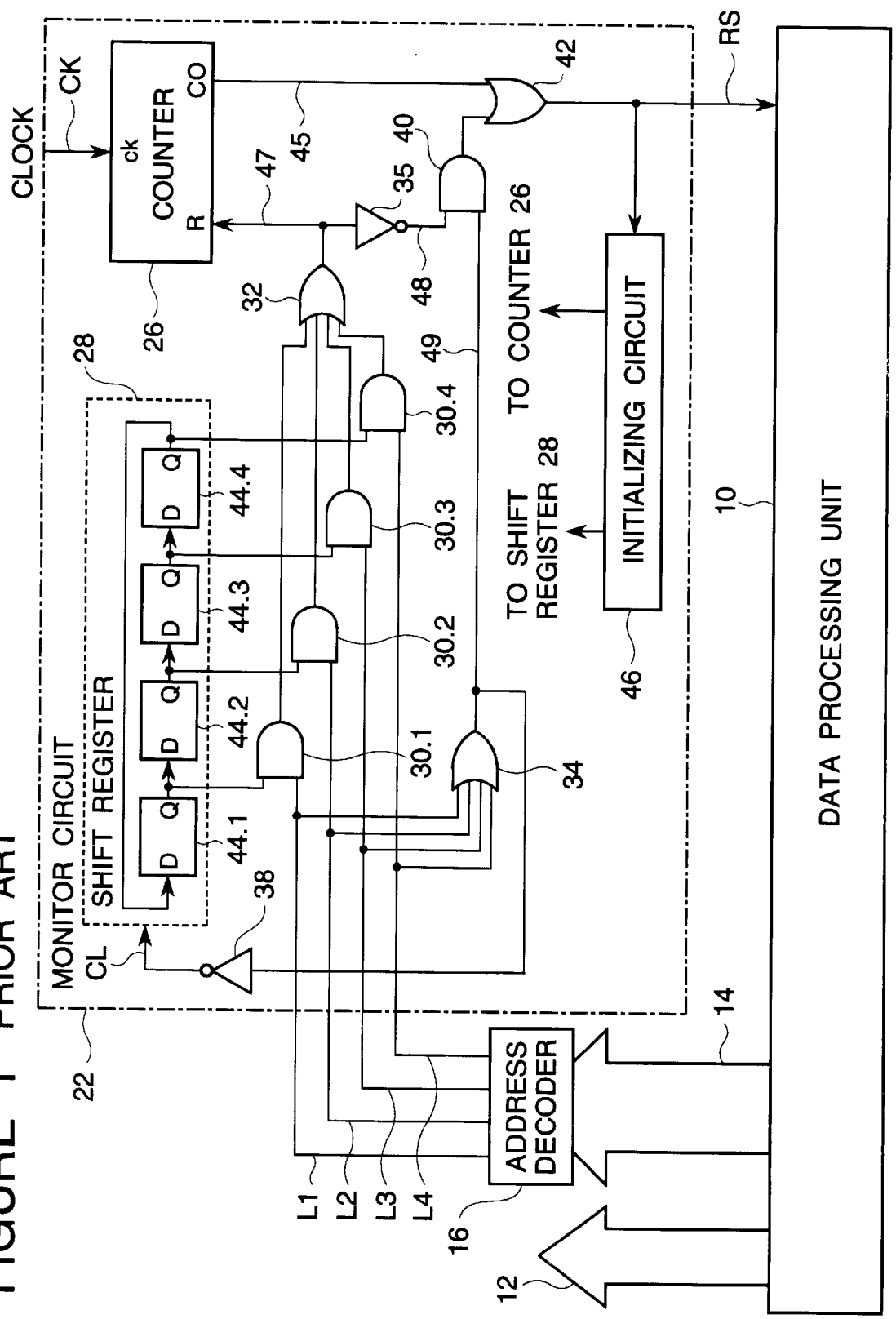
FIG. 1 is a block diagram of one example of a conventional data processing system having a runaway monitoring function.
Figure 2:
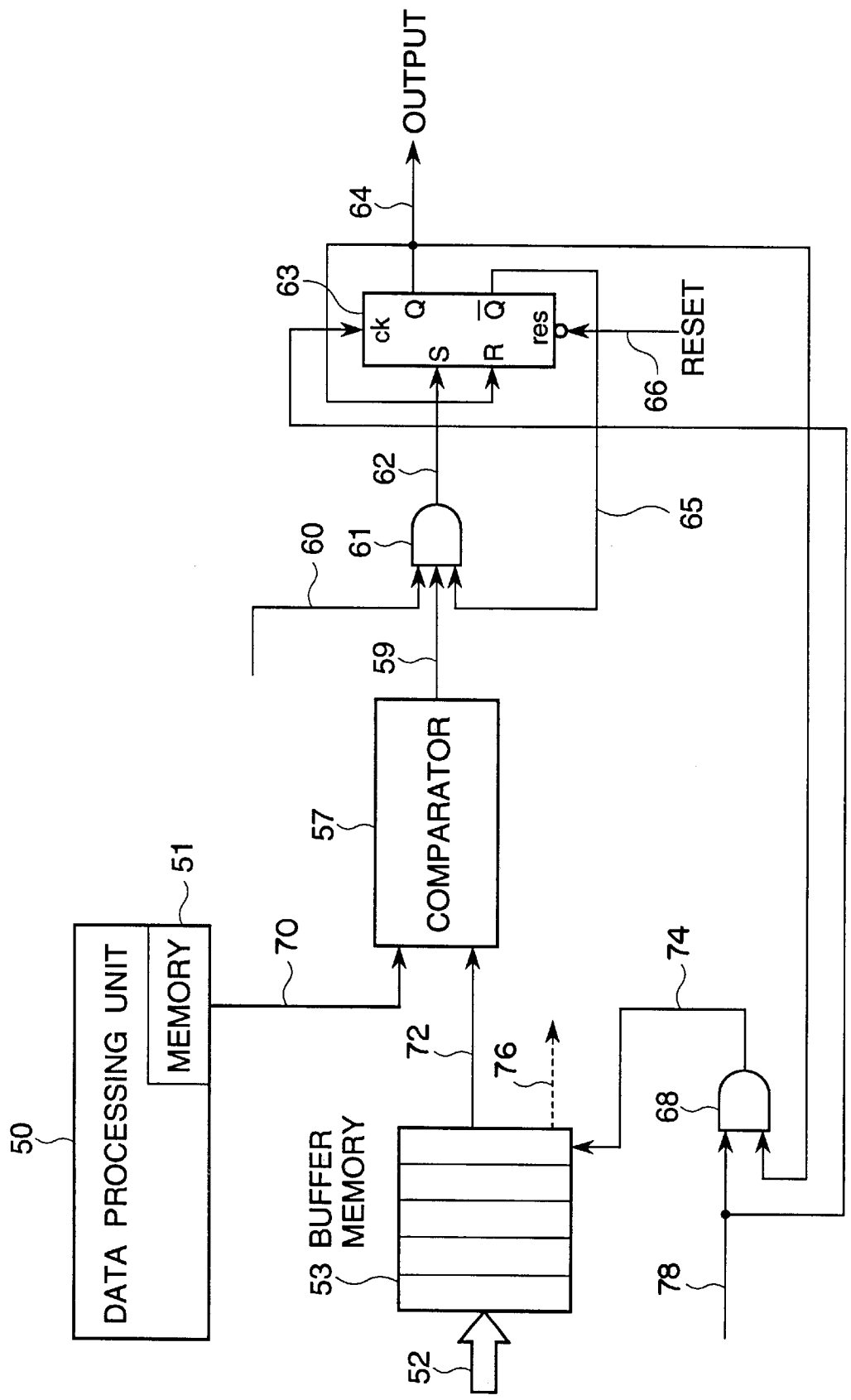
FIG. 2 is a block diagram of another example of a conventional data processing system having a runaway monitoring function.
Figure 3:
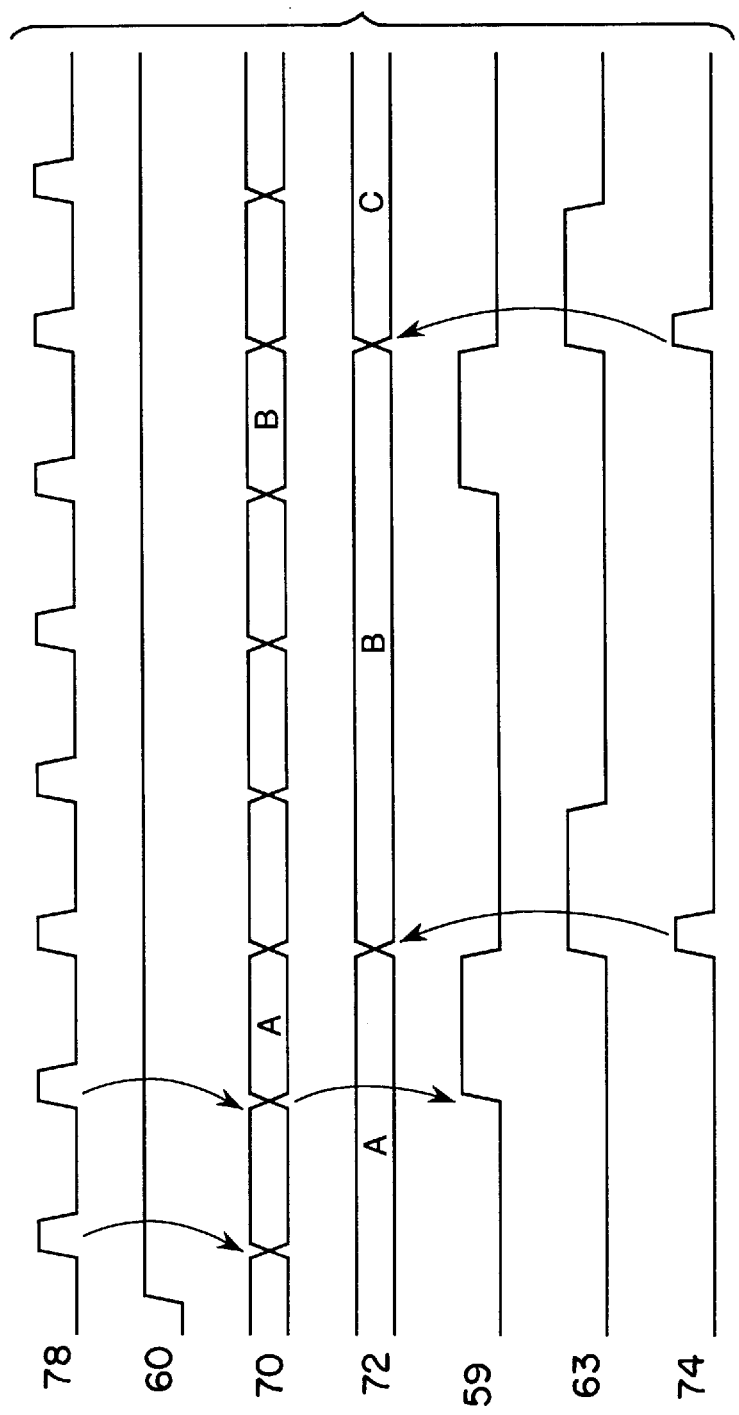
FIG. 3 is a timing chart illustrating an operation of the runaway monitoring function shown in FIG. 2.
Figure 4:
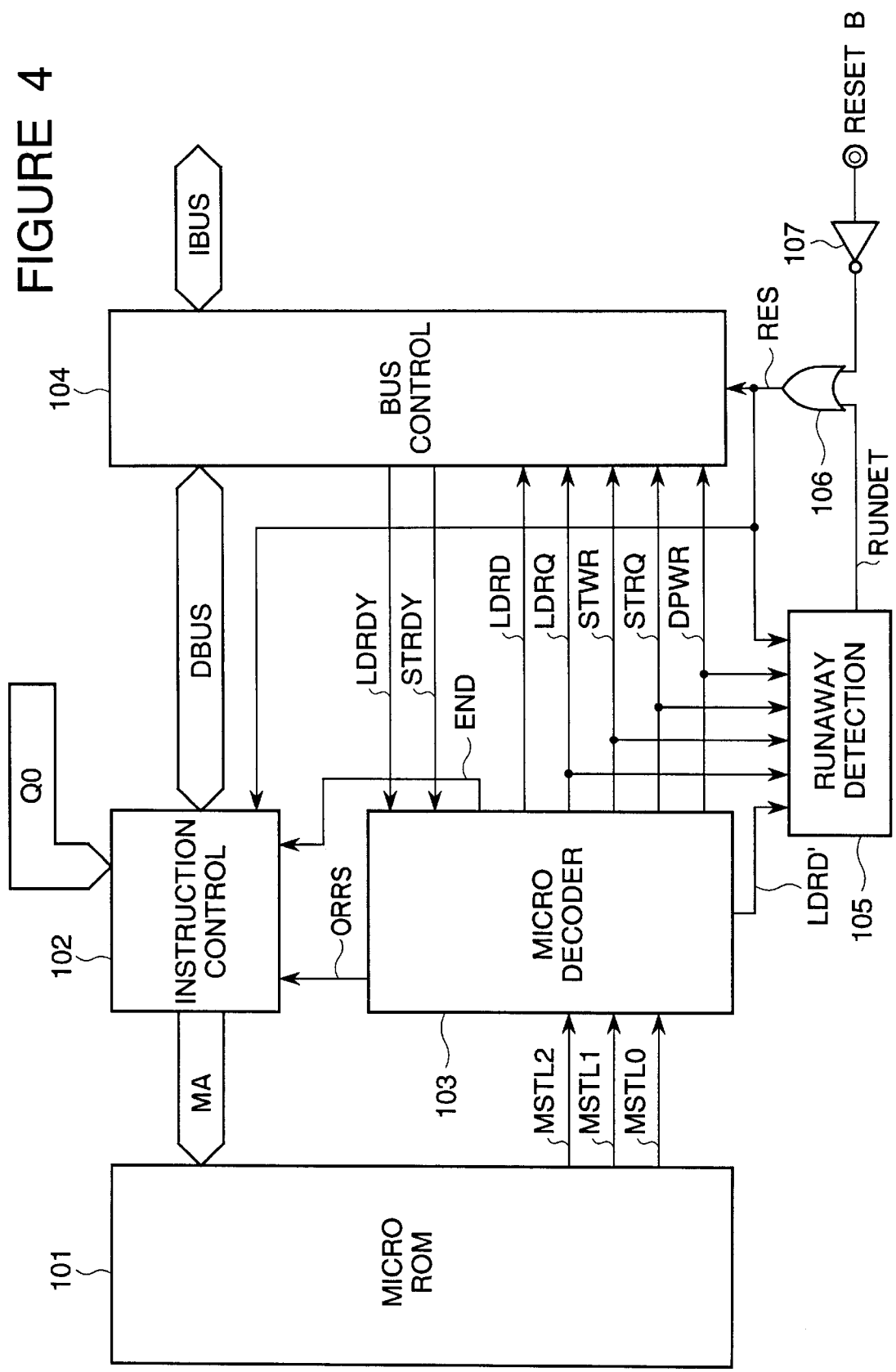
FIG. 4 is a block diagram of a first embodiment of the data processing system having a runaway monitoring function in accordance with the present invention.

Referring to FIG. 4, there is shown a block diagram of a first embodiment of the microprogram controlled data processing system having a runaway monitoring function in accordance with the present invention.

The shown data processing system includes a micro ROM 101, an instruction controller 102, a micro decoder 103, a bus controller 104, a runaway controller 105, an OR gate 106 and an inverter 107, which are connected as shown in FIG. 4.

The instruction controller 102 receives an instruction code Q0 supplied internally or externally, a microorder end signal END supplied from the micro decoder 103 and indicating an end of the microorder, and an operation retain request signal ORRS also supplied from the micro decoder 103, and outputs a micro address MA indicative of an execution address of a microprogram. Furthermore, the instruction controller 102 receives a reset signal RES.

The micro ROM 101 receives the micro address MA, and outputs microcodes MSTL2, MSTL1 and MSTL0 (where, "MSTL" is an abbreviation of Micro ROM Store Latch). The micro decoder 103 receives the microcodes MSTL2, MSTL1 and MSTL0, a status signal LDRDY (where, "LDRDY" is an abbreviation of Load Ready), another status signal STRDY (where, "STRDY" is an abbreviation of Store Ready), and outputs microorder signals DPWR (Date Pointer Write), STRQ (Store Request), STWR (Store Write), LDRQ (Load Request), LDRD (Load Read) and LDRD', and the microorder end signal END. Here, as will be seen from FIG. 7, the status signal LDRD' is a signal that is supplied to an AND gate together with a Load Ready signal in order to obtain the signal LDRD, and which is an output of an AND gate receiving signals MSTL0, MSTL1B (here, "B" indicates an inverted signal) and MSTL2).

The bus controller 104 receives the microorder signals DPWR, STRQ, STWR, LDRQ and LDRD, and outputs the state signals LDRDY and STRDY. The bus controller 104 also receives the reset signal RES, and is coupled to a data bus DBUS coupled to the instruction controller 102, and another data bus IBUS coupled to an internal memory (not shown) and an external memory (not shown).

The runaway detection circuit 105 receives the microorder signals DPWR, STRQ, STWR, LDRQ and LDRD' and the reset signal RES, and outputs a runaway detection signal RUNDET.

The two-input OR gate 106 has a first input receiving from the inverter 107 an inverted signal of a signal applied to an external terminal RESET B, and a second input receiving the runaway detection signal RUNDET. The OR gate 106 generates the reset signal RES.

Now, operation of each of respective blocks shown in FIG. 4 will be described. Here, it is to be noted that the shown data processing system operates in a microprogram controlled manner in synchronism with a dual phase clock including clocks C1 and C2 that do not overlap with each other. As shown in FIG. 5, in addition, in an instruction code "n", a memory WRITE instruction is defined, and in an instruction code "m", a memory READ instruction is defined. Instruction codes "n+1", "n+2", "n+3", "m+1", "m+2" and "m+3" are not defined.

The instruction controller 102 generates the microcode address MA on the basis of a given instruction code Q0 at an instruction start timing. Correspondence between the instruction code Q0 and the micro addresses is shown in the table of FIG. 5.

If the microcode address MA is determined at the instruction start timing, the microcode address MA is incremented for each clock C1 until the microorder end signal END is generated. However, during a period 20 in which the operation retain request signal ORRS is at "1", the microcode address MA is not incremented, so that the current microcode address MA is maintained. If the microorder end signal END is generated, it is recognized that the current instruction has been completed, and therefore, the processing goes to a next instruction.

The micro decoder 103 responds to the microcodes MSTL2, MSTL1 and MSTL0 that are supplied from the micro ROM 101 and that are a binary signal indicative of "1" or "0", and generates a group of microorders DPWR, STRQ, STWR, LDRQ, LDRD and END, which function as actual microinstructions. However, during a period in which the status signal LDRDY from the bus controller 104 is at "0", the micro decoder 103 stops generation of the microorder LDRD, and during a period in which the status signal STRDY from the bus controller 104 is at "0", the micro decoder 103 stops generation of the microorder DPWR. In addition, in both situations, the micro decoder 103 activates the operation retain request signal ORRS to "1".

The above mentioned operation of the micro decoder 103 is shown in the table of FIG. 6. In FIG. 6, the mark "x" means that either the logical value "1" or "0" may be taken, and the microorder "NOP" means that no microorder is outputted.

Figure 7:
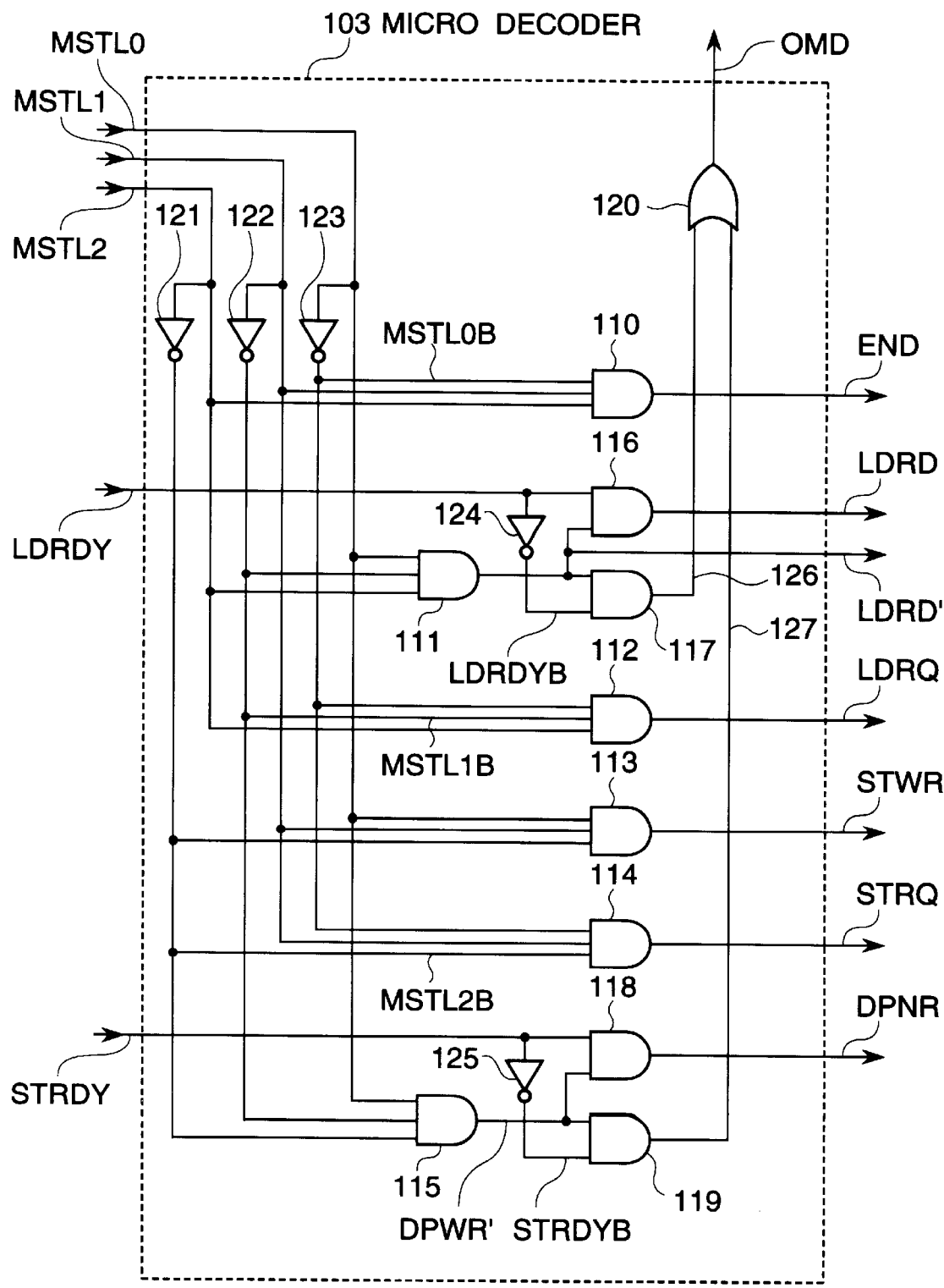
FIG. 7 is a circuit diagram showing one example of the micro decoder included in the data processing system shown in FIG. 4.

Referring to FIG. 7, there is shown a circuit diagram showing one example of the micro decoder realizing the logic operation shown in the table of FIG. 6.

The micro decoder 103 includes an inverter 121 receiving the signal MSTL2 to output an inverted signal MSTL2B (here, "B" indicates an inverted signal), another inverter 122 receiving the signal MSTL1 to output an inverted signal MSTL1B, and still another inverter 123 receiving the signal MSTL0 to output an inverted signal MSTL0B. The micro decoder 103 also includes a further inverter 124 receiving the signal LDRDY to output an inverted signal LDRDYB, and a still further inverter 125 receiving the signal STRDY to output an inverted signal STRDYB.

The micro decoder 103 further includes a three-input AND gate 110 receiving the signals MSTL0B, MSTL1 and MSTL2 to generate the microorder signal END, a three-input AND gate 111 receiving the signals MSTL0, MSTL1B and MSTL2 to generate the microorder signal LDRD', a three-input AND gate 112 receiving the signals MSTL0B, MSTL1B and MSTL2 to generate the microorder signal LDRQ, a three-input AND gate 113 receiving the signals MSTL0, MSTL1 and MSTL2B to generate the microorder signal STWR, a three-input AND gate 114 receiving the signals MSTL0B, MSTL1 and MSTL2B to generate the microorder signal STRQ, a three-input AND gate 115 receiving the signals MSTL, MSTL1B and MSTL2B to generate the microorder signal DPWR', a two-input AND gate 116 receiving the signals LDRDY and LDRD' to generate the microorder signal LDRD, a two-input AND gate 117 receiving the signals LDRD' and LDRDYB to generate a signal 126, a two-input AND gate 118 receiving the signals STRDY and DPWR' to generate the microorder signal DPWR, a two-input AND gate 119 receiving the signals DPWR' and STRDYB to generate a signal 127, and a two-input OR gate receiving the signals 126 and 127 to generate the operation retain request signal ORRS.

The micro ROM 101 receives the micro address MA and generates the microcodes MSTL2, MSTL1 and MSTL0. The micro ROM 101 stores microprograms shown in FIG. 8.

Figure 9:
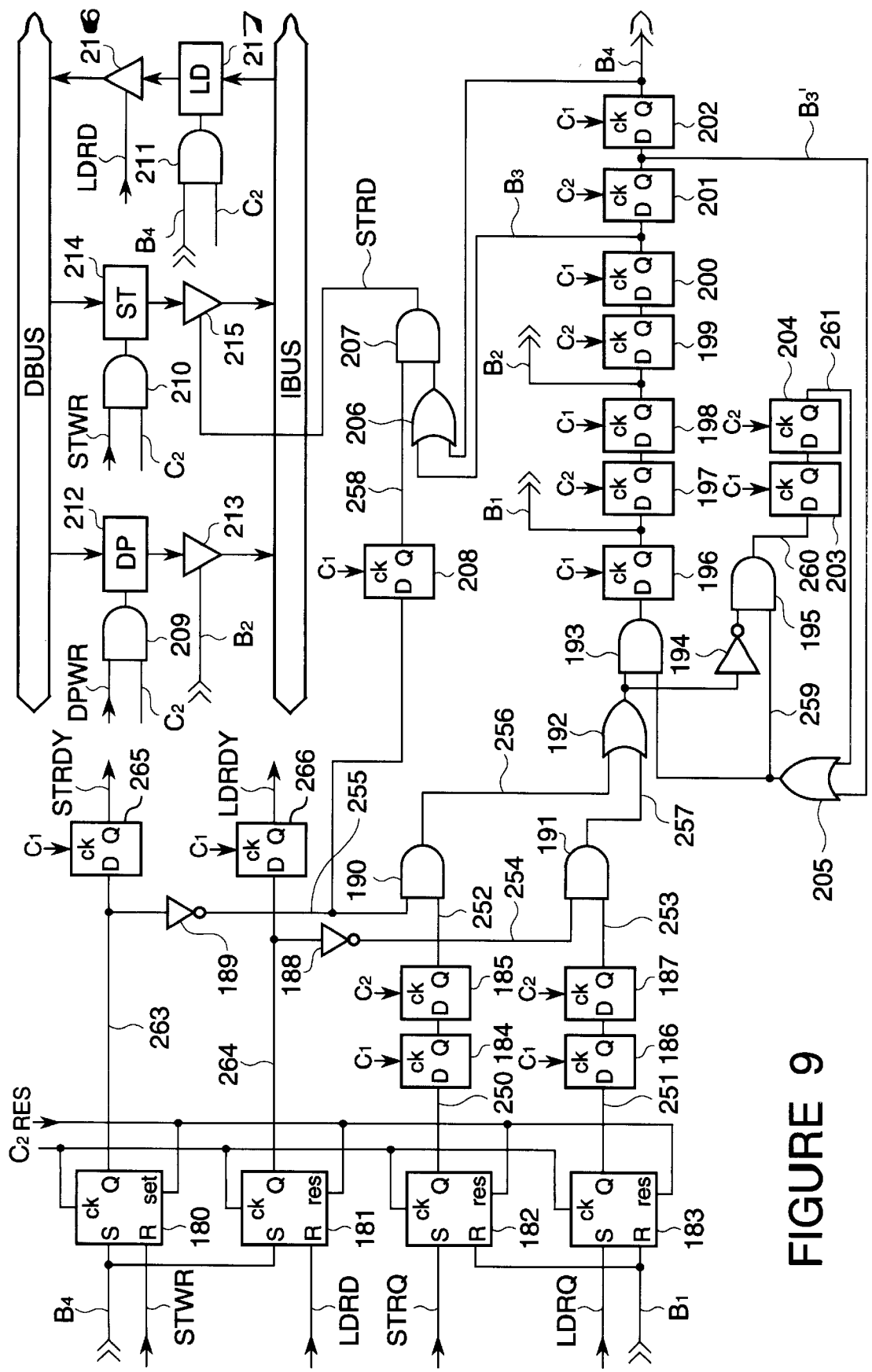
FIG. 9 is a circuit diagram showing one example of a bus controller included in the data processing system shown in FIG. 4.

The bus controller 104 can be constituted of a logic circuit having the construction shown in FIG. 9

The bus controller 104 includes a flipflop 180 having a set input S receiving a signal B4, a reset input R receiving the signal STWR, a clock input "ck" receiving the clock C2, an asynchronous set input "set" receiving the reset signal RES and an output Q outputting a signal 263, a flipflop 181 having a set input S receiving the signal B4, a reset input R receiving the signal LDRD, a clock input "ck" receiving the clock C2, an asynchronous reset input "res" receiving the reset signal RES and an output Q outputting a signal 264, a flipflop 182 having a set input S receiving the signal STRQ, a reset input R receiving a signal B1, a clock input "ck" receiving the clock C2, an asynchronous reset input "res" receiving the reset signal RES and an output Q outputting a signal 250, and a flipflop 183 having a set input S receiving the signal LDRQ, a reset input R receiving the signal B1, a clock input "ck" receiving the clock C2, an asynchronous reset input "res" receiving the reset signal RES and an output Q outputting a signal 251.

The bus controller 104 also includes a latch 184 having a data input D receiving the signal 250 and a clock input "ck" receiving the clock C1, a latch 185 having a data input D receiving an output of the latch 184 and a clock input "ck" receiving the clock C2, a latch 186 having a data input D receiving the signal 251 and a clock input "ck" receiving the clock C1, and a latch 187 having a data input D receiving an output of the latch 186 and a clock input "ck" receiving the clock C2.

Furthermore, the bus controller 104 includes an inverter 189 receiving the signal 263 to output a signal 255, another inverter 188 receiving the signal 264 to output a signal 254, a two-input AND gate 190 receiving the signals 252 and 255 to generate a signal 256, a two-input AND gate 191 receiving the signals 253 and 254 to generate a signal 257, a two-input OR gate 192 receiving the signals 256 and 257 to generate a signal 262, and a two-input AND gate 193 receiving the signals 262 and 259.

The bus controller 104 also includes a latch 196 having a data input D receiving an output of the AND gate 193 and a clock input "ck" receiving the clock C1 so as to generate the above mentioned signal B1, a latch 197 having a data input D receiving the signal B1 and a clock input "ck" receiving the clock C2, a latch 198 having a data input D receiving an output of the latch 197 and a clock input "ck" receiving the clock C1 so as to generate a signal B2, a latch 199 having a data input D receiving the signal B2 and a clock input "ck" receiving the clock C2, a latch 200 having a data input D receiving an output of the latch 199 and a clock input "ck" receiving the clock C1 so as to generate a signal B3, a latch 201 having a data input D receiving the signal B3 and a clock input "ck" receiving the clock C2 so as to generate a signal B3', and a latch 202 having a data input D receiving the signal B3' and a clock input "ck" receiving the clock C1 so as to generate a signal B4.

In addition, the bus controller 104 includes a two-input OR gate 205 receiving a signal 261 and the signal B3' to generate a signal 259, an inverter 194 receiving the signal 262, a two-input AND gate 195 receiving an output of the inverter 194 and the signal 259 to generate a signal 260, a latch 203 having a data input D receiving the signal 260 and a clock input "ck" receiving the clock C1, a latch 204 having a data input D receiving an output of the latch 203 and a clock input "ck" receiving the clock C2 so as to generate the above mentioned signal 261, and a latch 208 having a data input D receiving the signal 255 and a clock input "ck" receiving the clock C1 so as to generate a signal 258.

Further, the bus controller 104 includes a two-input OR gate 206 receiving the signals B3 and B4, a two-input AND gate 207 receiving an output of the two-input OR gate 206 and the signal 258 so as to generate the signal STRD, a two-input AND gate 209 receiving the signal DPWR and the clock C2, a latch 212 having an input connected to the bus DBUS and a clock input receiving an output of the AND gate 209, a driver 213 receiving an output of the latch 212 and controlled by the signal B2 so as to supply an output to the bus IBUS, a two-input AND gate 210 receiving the signal DPWR and the clock C2, a latch 214 having an input connected to the bus DBUS and a clock input receiving an output of the AND gate 210, a driver 215 receiving an output of the latch 214 and controlled by the signal STRD so as to supply an output to the bus IBUS, a two-input AND gate 211 receiving the signal B4 and the clock C2, a latch 217 having an input connected to the bus IBUS and a clock input receiving an output of the AND gate 211, a driver 216 receiving an output of the latch 217 and controlled by the signal LDRD so as to supply an output to the bus DBUS, a latch 265 having an input D receiving the signal 263 and a clock input "ck" receiving the clock C1 so as to generate the status signal STRDY, and a latch 266 having an input D receiving the signal 264 and a clock input "ck" receiving the clock C1 so as to generate the status signal LDRDY.

Figure 10:
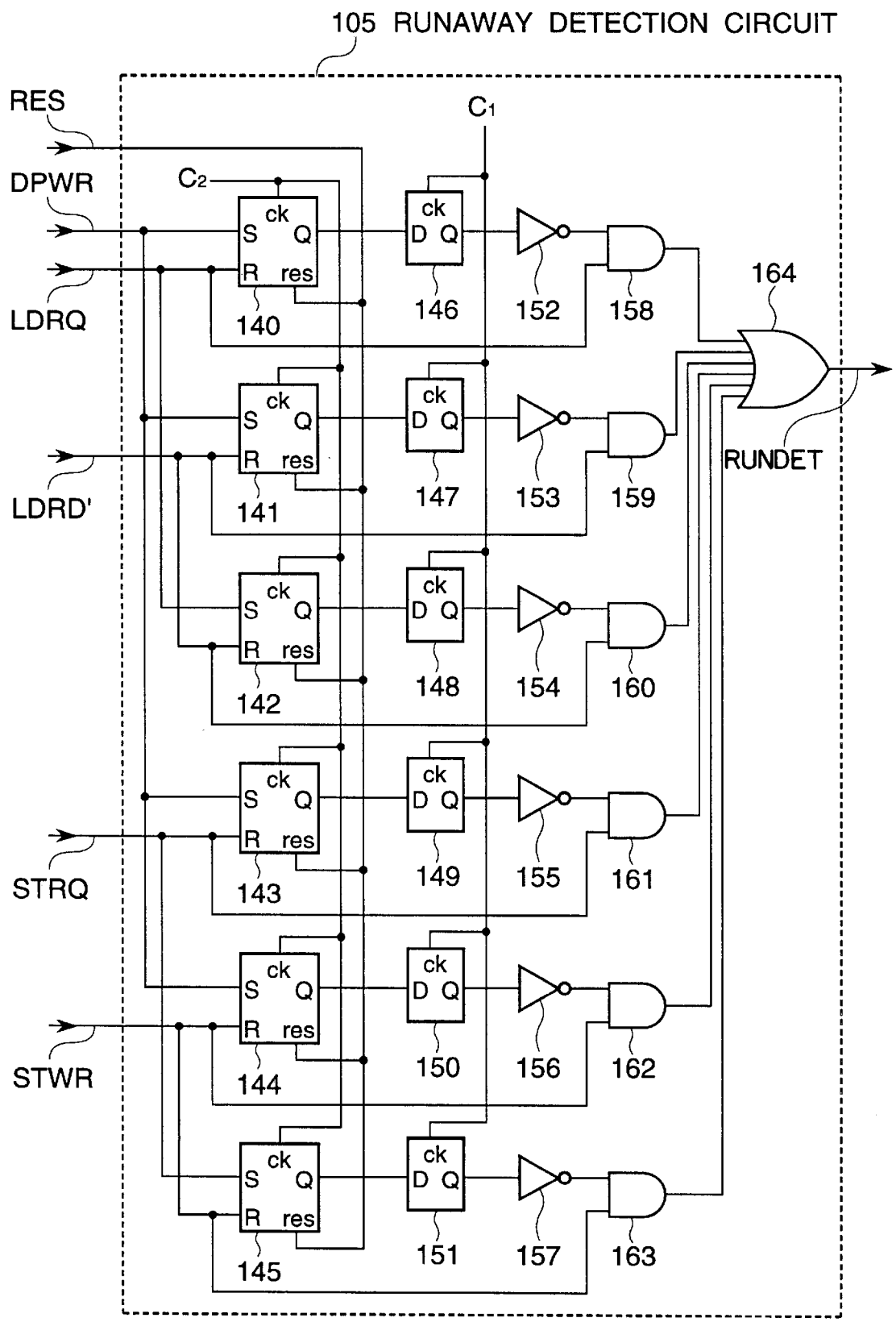
FIG. 10 is a circuit diagram showing one example of a runaway detection unit included in the data processing system shown in FIG. 4.

The runaway detection circuit 105, which is a featured portion of the present invention, can be constituted of a logic circuit shown in FIG. 10.

The runaway detection circuit 105 includes a flipflop 140 having a set input S receiving the signal DPWR, a reset input R receiving the signal LDRQ, a clock input "ck" receiving the clock C2, an asynchronous reset input "res" receiving the reset signal RES, a latch 146 having a data input D connected to an output Q of the flipflop 140 and a clock input "ck" receiving the clock C1, an inverter 152 receiving an output Q of die latch 146, and a two-input AND gate 158 receiving an output of the inverter 152 and the signal LDRQ.

The runaway detection circuit 105 also includes a flipflop 141 having a set input S receiving the signal DPWR, a reset input R receiving the signal LDRD', a clock input "ck" receiving the clock C2, an asynchronous reset input "res" receiving the reset signal RES, a latch 147 having a data input D connected to an output Q of the flipflop 141 and a clock input "ck" receiving the clock C1, an inverter 153 receiving an output Q of the latch 147, and a two-input AND gate 159 receiving an output of the inverter 153 and the signal LDRD'.

Furthermore, the runaway detection circuit 105 includes a flipflop 142 having a set input S receiving the signal LDRD, a reset input R receiving the signal LDRD', a clock input "ck" receiving the clock C2, an asynchronous reset input "res" receiving the reset signal RES, a latch 148 having a data input D connected to an output Q of the flipflop 142 and a clock input "ck" receiving the clock C1, an inverter 154 receiving an output Q of the latch 148, and a two-input AND gate 160 receiving an output of the inverter 154 and the signal LDRD'.

In addition, the runaway detection circuit 105 includes a flipflop 143 having a set input S receiving the signal DPWR, a reset input R receiving the signal STRQ, a clock input "ck" receiving the clock C2, an asynchronous reset input "res" receiving the reset signal RES, a latch 149 having a data input D connected to an output Q of the flipflop 143 and a clock input "ck" receiving the clock C1, an inverter 155 receiving an output Q of the latch 149, and a two-input AND gate 161 receiving an output of the inverter 155 and the signal STRQ.

The runaway detection circuit 105 also includes a flipflop 144 having a set input S receiving the signal DPWR, a reset input R receiving the signal STWR, a clock input "ck" receiving the clock C2, an asynchronous reset input "res" receiving the reset signal RES, a latch 150 having a data input D connected to an output Q of the flipflop 144 and a clock input "ck" receiving the clock C1, an inverter 156 receiving an output Q of the latch 150 and a two-input AND gate 162 receiving an output of the inverter 156 and the signal STWR.

Moreover, the runaway detection circuit 105 includes a flipflop 145 having a set input S receiving the signal STRQ, a reset input R receiving the signal STWR, a clock input "ck" receiving the clock C2, an asynchronous reset input "res" receiving the reset signal RES, a latch 151 having a data input D connected to an output Q of the flipflop 145 and a clock input "ck" receiving the clock C1, an inverter 157 receiving an output Q of the latch 151, a two-input AND gate 163 receiving an output of the inverter 157 and the signal STWR, and a six-input OR gate 164 receiving an output of the AND gates 158, 159, 160, 161, 162 and 163 so as to generate the signal RUNDET.

Now, operation of the shown first embodiment will be explained.

First, "0" is applied to the external terminal RESET B, so that the instruction controller 102, the bus controller 104, and the runaway detection circuit 105 are initialized. With this initialization, the output signals of the flipflops 180 to 183 shown in FIG. 9 are brought as follows: STRDY="1", LDRDY="0", the signal 250="0", and the signal 251="0". In addition, all of the output signals of the flipflops 140 to 145 are set to "0", and the instruction controller 102 decodes the instruction code Q0 to start execution of the instruction.

In the following, the memory WRITE operation and the memory READ operation will be described with reference to timing charts.

(1) memory WRITE operation (instruction code Q0="n")

Figure 11:
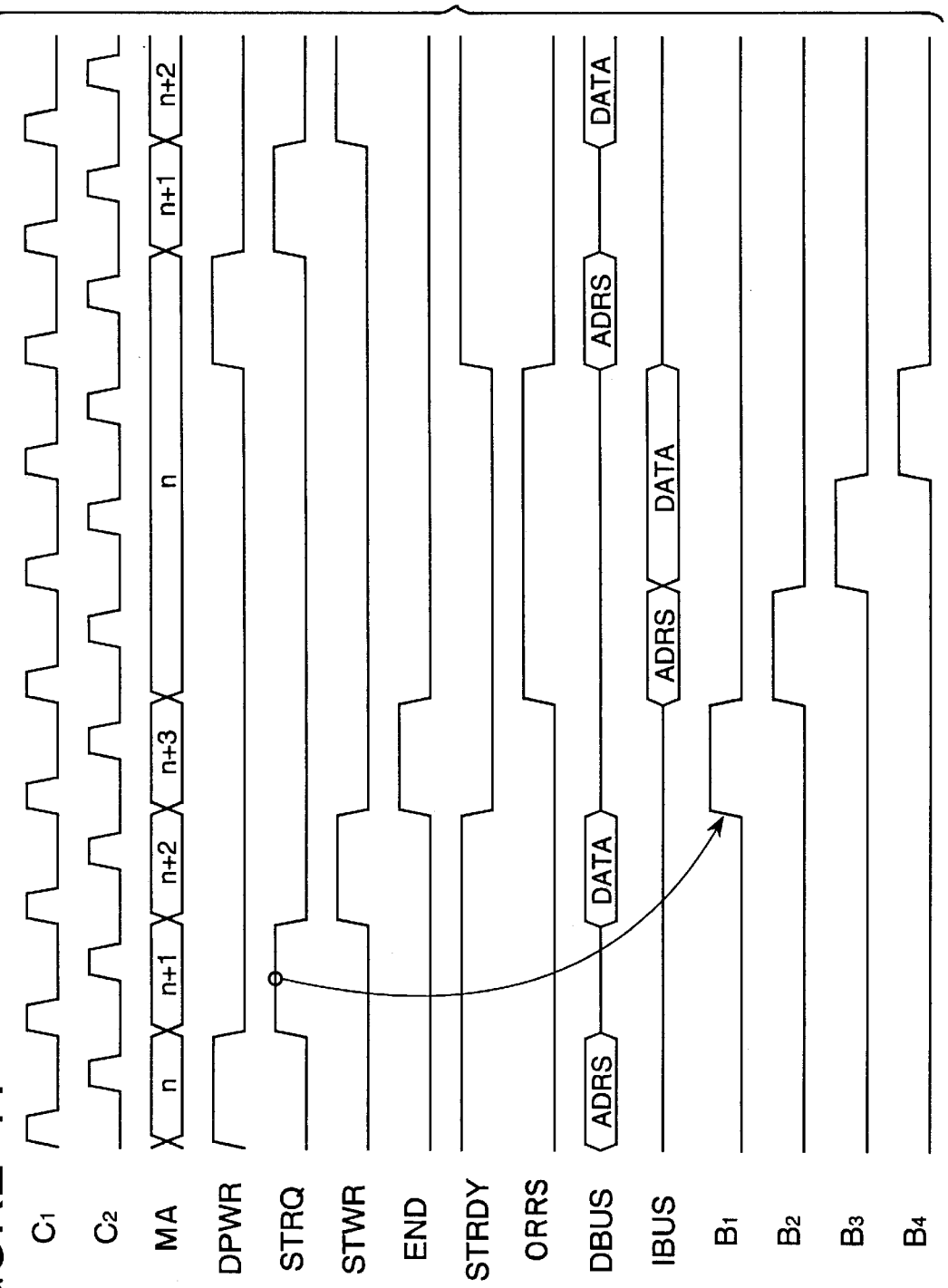
FIG. 11 is a timing chart illustrating a memory write operation in the data processing system shown in FIG. 4.

A timing chart illustrating a memory WRITE operation is shown in FIG. 11.

The instruction controller 102 decodes that the instruction code Q0="n" is a memory WRITE instruction, and outputs "n" as the micro address MA. The micro ROM 101 receives the micro address MA and outputs the microcodes MSTL2="0", MSTL1="0" and MSTL0="1".

The micro decoder 103 receives the microcodes MSTL2="0", MSTL1="0" and MSTL0="1" and the status signals LDRDY="0" and STRDY="1", and outputs the microorder DPWR="1" and the other microorders of "0". The bus controller 104 receives the microorder DPWR of "1", and latches the address on the bus DBUS in the latch 212.

At a next clock, the micro address MA is incremented to "n+1", so that the microorder STRQ is brought to "1". In response to the microorder STRQ of "1", the output signal 250 of the flipflop 182 shown in FIG. 9 is brought to the "1".

At a further next clock, the micro address MA is incremented to "n+2", so that the microorder STWR is brought to "1". In response to the microorder STWR of "1" the latch 214 shown in FIG. 6 latches data on the bus DBUS, and the output signal STRDY of the flipflop 180 is brought to "0". Since the just preceding clock signal 250 has become "1", the signal 252 is brought to "1" and the signal 256 is brought to "1".

At a still further next clock, the micro address MA is incremented to "n+3", so that the microorder END is brought to "1". In response to the microorder END of "1", the memory WRITE instruction is completed, so that in response to a next clock, the operation goes into execution of a new instruction. In addition, since the just preceding clock signal 256 has become "1", the signal B1 is brought to "1". With the feedback of the signal B1, the flipflop 182 is reset, so that the signal 250 becomes "0" and the signal STRDY also becomes "0", with the result that the signal 258 is brought to "1".

In response to a next clock, the instruction controller 102 decodes the instruction code Q0. Here, if the instruction code Q0="n", the micro address MA is brought to "n", again. In response to the micro address MA="n", it becomes that the microcodes MSTL2="0", MSTL1="0" and MSTL0="1". However, since the status signal STRDY="0", the operation retain request signal ORRS is brought "1", so that the microorder DPWR is not outputted. On the other hand, since the just preceding clock signal B1 has become "1", the signal B2 is brought to "1", so that the address is outputted through the driver 213 to the bus IBUS.

Also at a next clock, since the operation retain request signal OMD is still at "1", MA="n" is maintained. In response to the just preceding clock signal B2="1", the signal B3 is brought to "1", so that STRD is brought to "1", with the result that the data is outputted through the driver 215 onto the bus IBUS.

Also at a still further clock, since the operation retain request signal ORRS is still at "1", MA="n" is maintained. In response to the just preceding clock signal B3="1", the signal B4 is brought to "1", and therefore, STRD is maintained at "1". Thus, the data is outputted through the driver 215 onto the bus IBUS, following the just preceding clock. On the other hand, since the signal B4 is brought to "1", the output signal STRDY of the flipflop 180 is brought to "1". In accordance with the address and the data outputted on the bus IBUS, the data is written into a memory (not shown) connected to the bus IBUS. Thus, a series of processings for the data WRITE has terminated.

At a further next clock, the operation retain request signal ORRS is brought to "0", so that the microorder DPWR is outputted, and therefore, an operation similar to the above mentioned operation is performed.

(2) memory READ operation (instruction code Q0="m")

Figure 12:
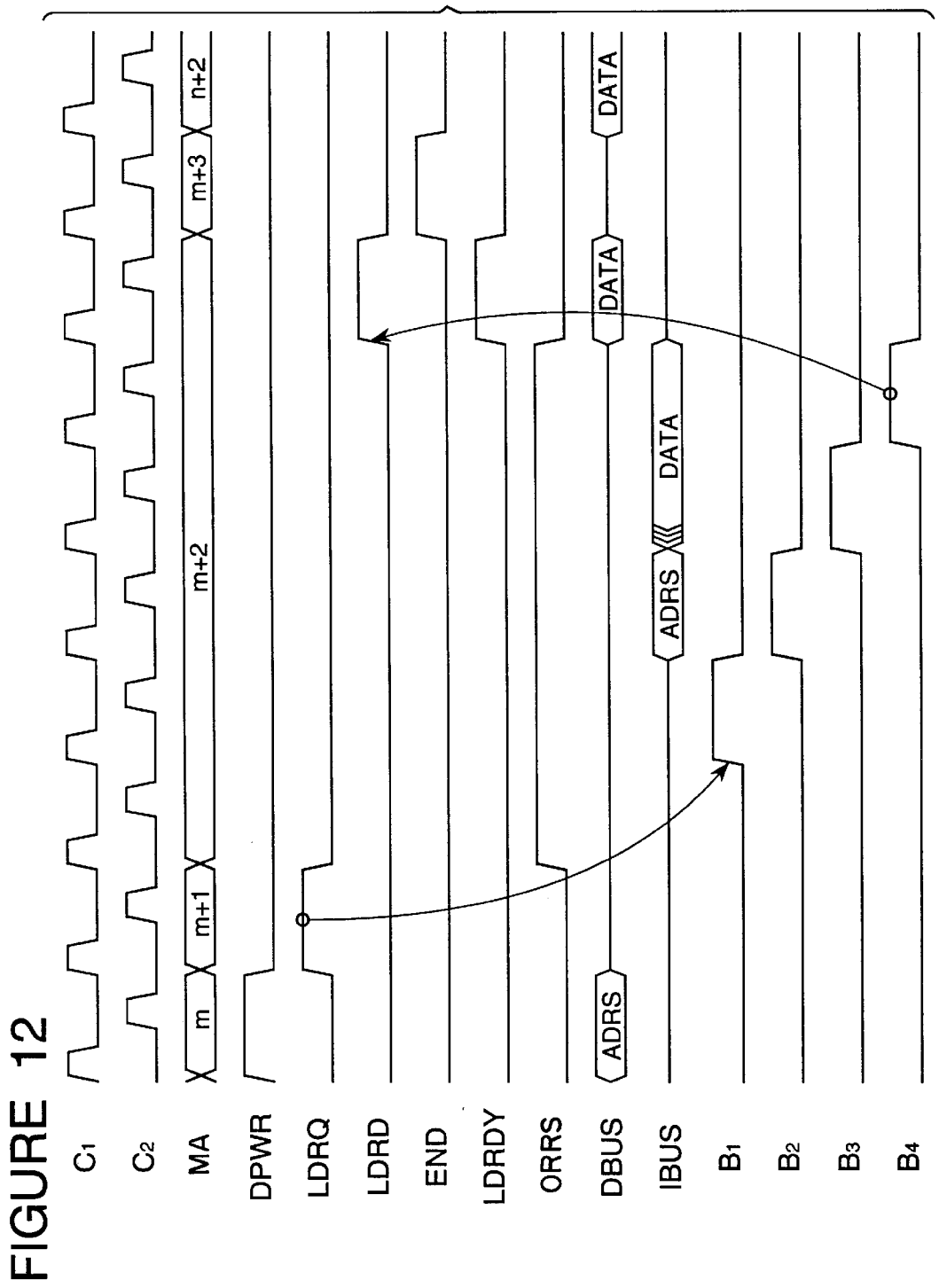
FIG. 12 is a timing chart illustrating a memory read operation in the data processing system shown in FIG. 4.

A timing chart illustrating a memory READ operation is shown in FIG. 12.

The instruction controller 102 decodes that a given instruction is a memory READ instruction, since the instruction code Q0="n", and outputs "m" as the micro address MA. Similarly to the memory WRITE operation as mentioned above, the microorder DPWR is brought to "1", so that an address on the bus DBUS is latched into the latch 212.

At a next clock, the micro address MA is incremented to "m+1", so that the microorder LDRQ is brought to "1". In response to the microorder STRQ of "1", the output signal 251 of the flipflop 183 shown in FIG. 9 is brought to the "1".

At a further next clock, the micro address MA is incremented to "m+2", so that it becomes that the microcodes MSTL2="1", MSTL1="0" and MSTL0="0". However, since the status signal LDRDY is "0", the microorder LDRD is not outputted, and the operation retain request signal ORRS is brought to "1". In addition, in response to the just preceding clock signal 251 of "1", the signal 253 is brought to "1" and the signal 257 is brought to "1".

At still further next clock, since the operation retain request signal ORRS is still at "1", MA="m+2" is maintained. In response to the just preceding clock signal 257 of "1", the signal B1 is brought to "1", so that the flipflop 183 is reset, and therefore, the signal 251 is brought to "0".

Also at a next clock, since the operation retain request signal ORRS is still at "1", MA="m+2" is maintained. In response to the just preceding clock signal B1="1", the signal B2 is brought to "1", and therefore, an address is outputted through the driver 213 onto the bus IBUS.

Also at a further next clock, since the operation retain request signal ORRS is still at "1", MA="m+2" is maintained. In response to the just preceding clock signal B2="1", the signal B3 is brought to "1".

Also at a further clock, since the operation retain request signal ORRS is still at "1", MA="m+2" is maintained. In response to the just preceding clock signal B3="1", the signal B4 is brought to "1", so that data outputted from a memory (not shown) connected to the bus IBUS is fetched into the latch 217, and the flipflop 181 set, with the result that the status signal LDRDY is brought "1".

At a next clock, in response to the change of the status signal LDRDY, the microorder LDRD is outputted, and the operation retain request signal ORRS is brought to "0".

In response to the microorder LDRD, data in the latch 217 is outputted through the driver 216 to the bus DBUS, and the instruction controller 102 then fetches the data on the bus DBUS. On the other hand, the flipflop 181 is reset, and the status signal LDRDY is brought to "0".

At a further next clock, the micro address MA is incremented to "m+3", so that the microorder END is outputted. With this, the instruction controller 102 recognizes an end of the instruction, The above is an operation of the system in a normal condition.

Next, explanation will be made on an operation when the instruction code Q0 is "n+1", "n+2", "m+1" and "m+2" in the case that the runaway detecting circuit 105 is omitted, before explanation will be made on what runaway condition is detected by the runaway detecting, circuit 105 and what erroneous operation can be avoided.

(a) instruction code Q0="n+1"

In this case, the instruction controller 102 outputs the micro address "n+1". Therefore, the microorder STRQ is outputted. Thereafter, the micro address MA is incremented to "n+2" and then to "n+3", the status changes similarly to the above mentioned data WRITE operation. However, since the microorder DPWR is not generated, the data is written into an indefinite address.

(b) instruction code Q0="n+2"

In this case, the instruction controller 102 outputs "n+2" as the micro address MA. Therefore, the microorder STWR is outputted, and the status signal STRDY is brought to "0". The status signal STRDY is set in response to the signal B4 generated from the microorder STRQ, but in this situation, since the microorder STRQ has not been outputted, "Q " continues to be maintained. When the microorders become MSTL2="0", MSTL1="0" and MSTL0="1", the signal condition remains unchanged from DPWR'="1", DPWR="0" and ORRS="1" (dead lock condition).

(c) instruction code Q0="m+1"

In this case, the instruction controller 102 outputs "m+1" as the micro address MA. Therefore, the microorder LDRQ is outputted. Thereafter, the MA is incremented to "m+2" and then to "m+3", the status changes similarly to the above mentioned data READ operation. However, since the microorder DPWR is not generated, the data is read from an indefinite address.

(d) instruction code Q0="m+2"

In this case, the instruction controller 102 outputs "m+2" as the micro address MA. Accordingly, the signal LDRD' is brought to "1". Since LDRDY is normally at "0", the condition remains unchanged from ORRS="1" (dead lock condition).

In the above, the four abnormal operations have been explained. Next, operation when the runaway detecting circuit 105 is added will be described.

(A) instruction code Q0="n+1"

In this case, the instruction controller 102 outputs the micro address "n+1". Therefore, the microorder STRQ is outputted. At this time, since the output of the inverter 155 is at "1", the AND gate 161 outputs "1", so that the runaway detection signal RUNDET is brought to "1". In response to the runaway detection signal RUNDET of "1", the reset signal RES is brought to "1" so as to initialize the whole of the system. In addition, the reset signal RES is brought to "1" at the timing that the microorder STRQ is outputted, it is possible to avoid the writing into the memory.

(B) instruction code Q0="n+2"

In this case, when the microorder STWR is outputted, the output of the inverters 156 and 157 are brought to "1", so that the output of the AND gates 162 and 163 are also brought to "1", with the result that the runaway detection signal RUNDET is brought to "1". In response to the runaway detection signal RUNDET of "1", the reset signal RES is brought to "1" so as to initialize the whole of the system, and therefore, it is possible to avoid the system from going into the dead lock condition.

(C) instruction code Q0="m+1"

In this case, the instruction controller 102 outputs "m+1" as the micro address MA. Therefore, the microorder LDRQ is outputted. At this time, the output of the inverter 152 is brought to "1", so that the output of the AND gate 158 is brought to "1". Therefore, the runaway detection signal RUNDET is brought to "1". In response to the runaway detection signal RUNDET of "1", the reset signal RES is brought to "1" so as to initialize the whole of the system. In addition, the reset signal RES is brought to "1" at the timing that the microorder LDRQ is outputted, it is possible to avoid the reading from the memory.

(D) instruction code Q0="m+2"

In this case, when the signal LDRD' is outputted, the output of the inverters 153 and 154 are brought to "1", so that the output of the AND gates 150 and 160 are also brought to "1", with the result that the runaway detection signal RUNDET is brought to "1". In response to the runaway detection signal RUNDET of "1", the reset signal RES is brought to "1" so as to initialize the whole of the system, and therefore, it is possible to avoid the system from going into the dead lock condition.

As seen from the above, when a series of microorders DPWR and LDRQ generated by the micro decoder 103 in response to a given instruction code Q0 should be executed in the named order, the order of execution is detected by the flipflop 140, the latch 146, the inverter 152 and the AND gate 158 in the runaway detecting circuit 105 shown in FIG. 10.

Specifically, the first microorder DPWR is applied to the set input of the flipflop 140, and the second microorder LDRQ is applied to the reset input of the flipflop 140, and the Q output of the flipflop 140 is latched in the latch 146 so as to set a flag composed of the latch 146.

Accordingly, the flag of the latch 146 indicates "1" if the first microorder DPWR is executed, and "0" if the first microorder DPWR is not executed. Thereafter, the flag maintains that condition, which is transmitted through the inverter 152 to the AND gate 158.

Therefore, if the second microorder LDRQ is succeedingly executed, the output of the AND gate 158 shows "0", and therefore, abnormality is indicated. However, if the second microorder LDRQ is executed in the condition that the first microorder DPWR has not yet been executed (namely, when the flag of the latch 146 indicates "0"), both the inputs of the AND gate 158 become "1", so that the output of the AND gate 158 is brought to "1", and therefore, abnormality is indicated. Thus, it is possible to detect whether or not the order of execution of the microorder is correct.

Similarly, the order of execution of the microorders DPWR and LDRD' is detected by the flipflop 141, the latch 147, the inverter 153 and the AND gate 159, and the order of execution of the microorders LDRQ and LDRD' is detected by the flipflop 142, the latch 148, the inverter 154 and the AND gate 160. In addition, the order of execution of the microorders DPWR and STRQ is detected by the flipflop 143, the latch 149, the inverter 155 and the AND gate 161, and the order of execution of the microorders DPWR and STWR is detected by the flipflop 144, the latch 150, the inverter 156 and the AND gate 162. Furthermore, the order of execution of the microorders STRQ and STWR is detected by the flipflop 145, the latch 151, the inverter 157 and the AND gate 163.

Figure 13:
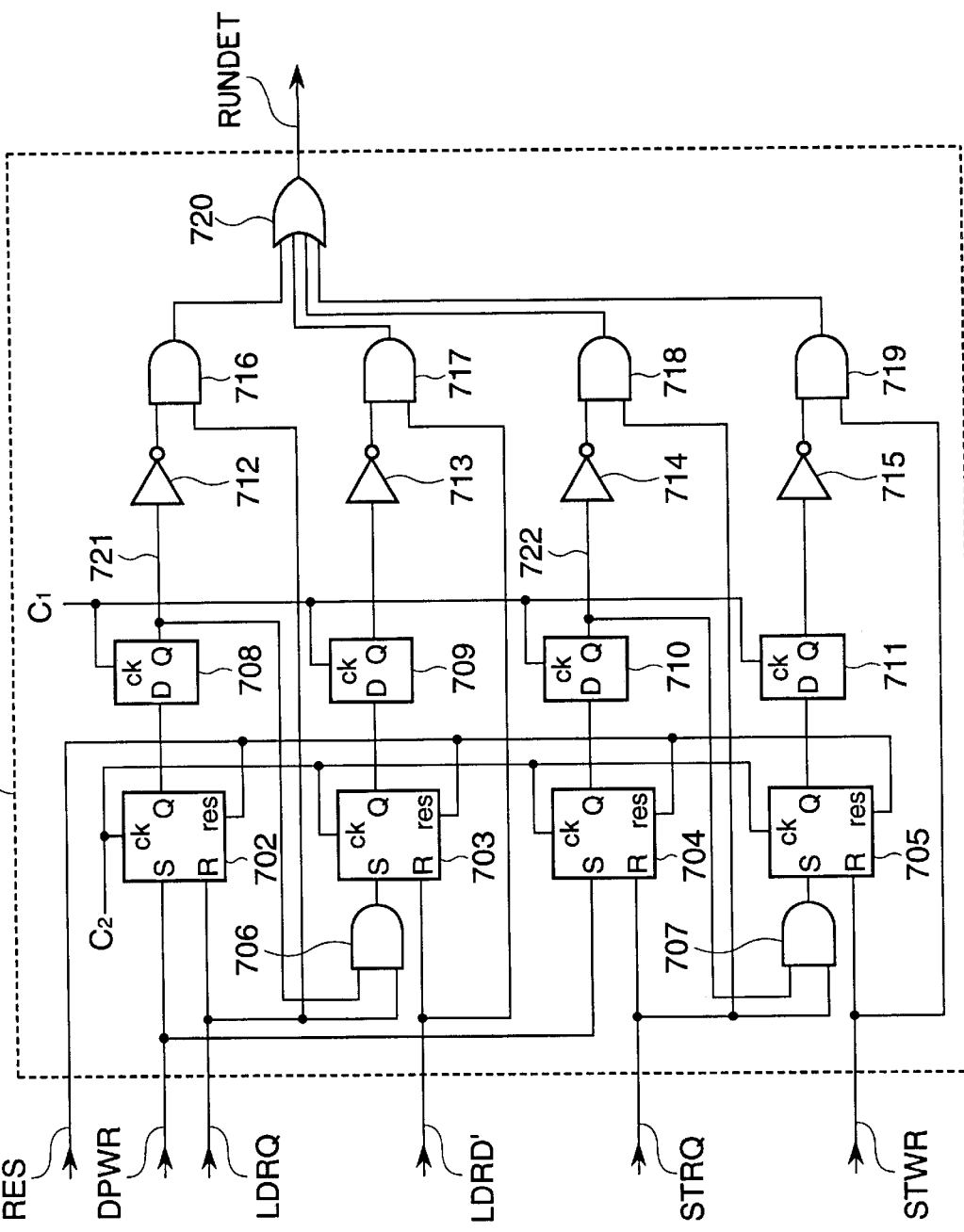
FIG. 13 is a circuit diagram showing another example of a runaway detection unit included in the data processing system shown in FIG. 4.

Referring to FIG. 13, there is shown a circuit diagram showing another example of a runaway detecting circuit 105, which is the featured portion of the present invention as mentioned hereinbefore. The circuit shown in FIG. 13 is composed of a reduced number of circuit elements in comparison with the circuit shown in FIG. 10.

The runaway detection circuit shown in FIG. 13 is generally designated by Reference Numeral 105A, and includes a flipflop 702 having a set input S receiving the signal DPWR, a reset input R receiving the signal LDRQ, a clock input "ck" receiving the clock C2, an asynchronous reset input "res" receiving the reset signal RES, a latch 708 having a data input D connected to an output Q of the flipflop 702 and a clock input "ck" receiving the clock C1 so as to output a signal 721, an inverter 712 receiving the signal 721, and a two-input AND gate 716 receiving an output of the inverter 712 and the signal LDRQ.

The runaway detection circuit 105A also includes a two-input AND gate 706 receiving the signal 721 and the signal LDRQ, a flipflop 703 having a set input S receiving an output of the AND gate 706, a reset input R receiving the signal LDRQ', a clock input "ck" receiving the clock C2, an asynchronous reset input "res" receiving the reset signal RES, a latch 709 having a data input D connected to an output Q of the flipflop 703 and a clock input "ck" receiving the clock C1, an inverter 713 receiving an output of the latch 709, and a two-input AND gate 717 receiving an output of the inverter 713 and the signal LDRQ'.

The runaway detection circuit 105A further includes a flipflop 704 having a set input S receiving the signal DPWR, a reset input R receiving the signal STRQ, a clock input "ck" receiving the clock C2, an asynchronous reset input "res" receiving the reset signal RES, a latch 710 having a data input D connected to an output Q of the flipflop 704 and a clock input "ck" receiving the clock C1 so as to output a signal 722, an inverter 714 receiving the signal 722, and a two-input AND gate 718 receiving an output of the inverter 714 and the signal STRQ.

In addition, the runaway detection circuit 105A also includes a two-input AND gate 707 receiving the signal 722 and the signal STRQ, a flipflop 705 having a set input S receiving an output of the AND gate 707, a reset input R receiving the signal STWR, a clock input "ck" receiving the clock C2, an asynchronous reset input "res" receiving the reset signal RES, a latch 711 having a data input D connected to an output Q of the flipflop 705 and a clock input "ck" receiving the clock C1, an inverter 713 receiving an output of the latch 711, a two-input AND gate 719 receiving an output of the inverter 715 and the signal STRQ, and a four-input OR gate 720 receiving an output of the two-input AND gates 716, 717, 718 and 719 so as to generate the runaway detection signal RUNDET.

Now, operation when the runaway detection circuit 105A shown in FIG. 13 is incorporated in the data processing system shown in FIG. 4 in place of the runaway detection circuit 105, will be described similarly the first embodiment shown in FIG. 10.

(A) instruction code Q0="n+1"

In this case, the microorder STRQ is outputted. At this time, since the output of the inverter 714 is at "1", the AND gate 718 outputs "1", so that the runaway detection signal RUNDET is brought to "1". In response to the runaway detection signal RUNDET of "1", the reset signal RES is brought to "1" so as to initialize the whole of the system.

(B) instruction code Q0="n+2"

In this case, the microorder STRQ is outputted. At this time, since the output of the inverter 715 is at "1", the AND gate 719 outputs "1", so that the runaway detection signal RUNDET is brought to "1". In response to the runaway detection signal RUNDET of "1", the reset signal RES is brought to "1" so as to initialize the whole of the system.

(C) instruction code Q0="m+1"

In this case, the microorder LDRQ is outputted. At this time, the output of the inverter 712 is brought to "1", so that the output of the AND gate 716 is brought to "1". Therefore, the runaway detection signal RUNDET is brought to "1". In response to the runaway detection signal RUNDET of "1", the reset signal RES is brought to "1" so as to initialize the whole of the system.

(D) instruction code Q0="m+2"

In this case, the signal LDRD' is outputted. At this time, the output of the inverter 713 is brought to "1", so that the output of the AND gate 717 is brought to "1". Therefore, the runaway detection signal RUNDET is brought to "1". In response to the runaway detection signal RUNDET of "1", the reset signal RES is brought to "1" so as to initialize the whole of the system.

This runaway detection circuit 105A is constructed by paying attention to the fact that in response to a given instruction code Q0, a series of microorders DPWR, LDRQ and LDRD' should be generated and executed in the named order, so that the order of execution of the first microorder DPWR and the second microorder LDRQ is detected by the flipflop 702, the latch 708, the inverter 712 and the AND gate 716 (which correspond to the flipflop 140, the latch 146, the inverter 152 and the AND gate 158 shown in FIG. 10), and whether or not the third microorder LDRD' is executed following the execution of the second microorder LDRQ is detected by the AND gate 706, the flipflop 703, the latch 709, the inverter 713 and the AND gate 717.

Specifically, since execution of the first microorder DPWR can be confirmed by referring to the flag condition of the latch 708, the output of the latch 708 and the second microorder LDRQ are applied to the AND gate 706, so that if both of the first microorder DPWR and the second microorder LDRQ have been executed, the flipflop 703 is set to "1" by the output of the AND gates 706.

Accordingly, the latch 709 is set to "1" when a flag indicating that both of the first microorder DPWR and the second microorder LDRQ have been executed. Therefore, if the execution timing of the third microorder LDRD' and the inverted signal of the flag output of the latch 707 by the inverter 713 are supplied to the AND gate 717, it is possible to discriminate whether or not whether or not the order of execution of the three microorders is correct.

Similarly, the order of execution of the microorders DPWR and the other microorders STRQ and STWR can be detected.

As seen from the above, the data processing system in accordance with the present invention is characterized in that the order of generation and execution of a series of predetermined microorders generated in response to a given instruction code is monitored so as to detect the runaway. Therefore, it is possible to detect the runaway in real time. Accordingly, it is possible to previously avoid interruption of data and system abnormality.

The invention has thus been shown and described with reference to the specific embodiments. However, it should be noted that the present invention is in no way limited to the details of the illustrated structures but changes and modifications may be made within the scope of the appended claims.

I claim:

1. A microprogram controlled data processing system comprising:

a microorder generating means for generating a predetermined series of microorders on the basis of an instruction code received; and an execution order detection means for monitoring an order of execution of said series of microorders so as to generate an abnormal signal on the basis of the result of the monitoring, wherein the predetermined series of microorders are control signals generated in response to the instruction code received, and wherein said series of microorders includes first and second microorders to be executed starting with the first microorder and then the second microorder, and said execution order detection means includes:

a setting means responsive to execution of said first microorder, for setting a flag indicating the execution of said first microorder; and a generating means for generating said abnormal signal on the basis of a content of said flag and the result of execution of said second microorder.

2. A microprogram controlled data processing system as claimed in claim 1, wherein said setting means includes a flipflop set in response to the execution of said first microorder and reset in response to the execution of said second microorder, and said flag is set based on an output of said flipflop, and wherein said generating means includes a gate means for receiving an output of said flag and a signal indicating the execution of said second microorder, for generating said abnormal signal when said flag is in a reset condition and said signal indicates that said second microorder has been executed.

3. A microprogram controlled data processing system as claimed in claim 2, further comprising a central processing unit for executing the microprogram, wherein said series of microorders control said central processing unit.

4. A microprogram controlled data processing system as claimed in claim 1, further comprising a central processing unit for executing the microprogram, wherein said series of microorders control said central processing unit.

5. A microprogram controlled data processing system comprising:

a microorder generating means for generating a predetermined series of microorders on the basis of an instruction code received; and an execution order detection means for monitoring an order of execution of said series of microorders so as to generate an abnormal signal on the basis of the result of the monitoring, wherein the predetermined series of microorders are control signals generated in response to the instruction code received, and wherein said series of microorders includes first, second and third microorders to be executed starting with said first microorder, then said second microorder, and then said third microorder, and said execution order detection means includes:

a first setting means responsive to execution of said first microorder, for setting a first flag indicating the execution of said first microorder;

a first generating means for generating a first abnormal signal on the basis of a content of said first flag and the result of execution of said second microorder;

a second setting means responsive to the execution of said second microorder, for setting a second flag indicating the execution of said second microorder; and a second generating means for generating a second abnormal signal on the basis of a content of said second flag and the result of execution of said third microorder.

6. A microprogram controlled data processing system as claimed in claim 5, wherein said first setting means includes a first flipflop set in response to the execution of said first microorder and reset in response to the execution of said second microorder, and said first flag is set based on an output of said first flipflop, and wherein said second setting means includes a second flipflop set in response to the execution of said second microorder and reset in response to the execution of said third microorder, and said second flag is set based on an output of said second flipflop.

7. A microprogram controlled data processing system as claimed in claim 6, wherein said first generating means includes a first gate means for receiving an output of said first flag and a first signal indicating the execution of said second microorder, for generating said first abnormal signal when said first flag is in a reset condition and said first signal indicates that said second microorder has been executed, and wherein said second generating means includes a second gate means for receiving an output of said second flag and a second signal indicating the execution of said third microorder, for generating said second abnormal signal when said second flag is in a reset condition and said second signal indicates that said third microorder has been executed, so that when at least one of said first and second abnormal signals is active, said abnormal signal is generated.

8. A microprogram controlled data processing system as claimed in claim 7, further comprising a central processing unit for executing the microprogram, wherein said series of microorders control said central processing unit.

9. An apparatus for detecting an abnormal condition during execution of a microprogram by a processing unit, the microprogram including at least one instruction code, said apparatus comprising:

an instruction controller configured to receive the instruction code and to generate a micro address based on the instruction code;

a micro ROM connected to receive the micro address from the instruction controller and to generate a set of micro codes corresponding to the instruction code;

a micro decoder connected to the instruction controller and the micro ROM, the micro decoder configured to receive the set of micro codes and to generate a predetermined series of microorders based on the set of micro codes, the series of microorders corresponding to control signals used to control the processing unit; and a runaway detecting circuit connected to receive the series of microorders output from the micro decoder, the runaway detecting circuit configured to detect a runaway condition during the execution of the microprogram based on whether or not the series of microorders correspond to an allowable series of microorders.

10. An apparatus as claimed in claim 9, wherein the runaway detecting circuit detects the runaway condition in real time during the execution of the microprogram.

11. An apparatus as claimed in claim 9, wherein one of the allowable series of microorders includes a data pointer write instruction, followed by a store write instruction, and followed by an END instruction.

* * * * *